(12) United States Patent
Fisher et al.

(10) Patent No.: US 9,417,420 B2
(45) Date of Patent: Aug. 16, 2016

(54) FIELD INSTALLABLE HIGH STRENGTH BREAKOUT KIT

(71) Applicant: AFL Telecommunications LLC, Duncan, SC (US)

(72) Inventors: Lance Fisher, York, PA (US); Ted Lichoulas, Simpsonville, SC (US)

(73) Assignee: AFL Telecommunications LLC, Duncan, SC (US)

( * ) Notice: Subject to any disclaimer, the term of this patent is extended or adjusted under 35 U.S.C. 154(b) by 0 days.

(21) Appl. No.: 14/352,418

(22) PCT Filed: Nov. 13, 2013

(86) PCT No.: PCT/US2013/069873
§ 371 (c)(1),
(2) Date: Apr. 17, 2014

(87) PCT Pub. No.: WO2014/078401
PCT Pub. Date: May 22, 2014

(65) Prior Publication Data
US 2015/0301300 A1    Oct. 22, 2015

Related U.S. Application Data

(60) Provisional application No. 61/725,621, filed on Nov. 13, 2012.

(51) Int. Cl.
*G02B 6/00*    (2006.01)
*G02B 6/44*    (2006.01)

(52) U.S. Cl.
CPC ............ *G02B 6/4477* (2013.01); *G02B 6/4471* (2013.01)

(58) Field of Classification Search
CPC .. G02B 6/4452; G02B 6/3897; G02B 6/4471; G02B 6/3825; G02B 6/4453
USPC .................................. 385/134, 135, 136, 137
See application file for complete search history.

(56) References Cited

U.S. PATENT DOCUMENTS

| | | |
|---|---|---|
| 5,970,195 A | 10/1999 | Brown |
| 2009/0060421 A1 | 3/2009 | Parikh et al. |
| 2010/0092136 A1 | 4/2010 | Nhep |
| 2011/0243514 A1 | 10/2011 | Nav |
| 2014/0314382 A1* | 10/2014 | Sato ..................... G02B 6/4403 385/103 |

OTHER PUBLICATIONS

International Search Report for PCT/US2013/069873 dated Apr. 4, 2014.

* cited by examiner

*Primary Examiner* — Jennifer Doan
(74) *Attorney, Agent, or Firm* — Dority & Manning, P.A.

(57) ABSTRACT

A fanout kit or assembly for holding furcation tubes may comprise a multifiber inlet screw on strain relief, a fanout housing, a plurality of furcation tubes, and a plurality of furcation assemblies for holding the plurality of furcation tubes. The fanout housing may have a fanout cover, a fanout base, a multifiber retention block for receiving the multifiber inlet screw on strain relief, and a furcation block for receiving the plurality of furcation tubes and the plurality of furcation assemblies.

11 Claims, 4 Drawing Sheets

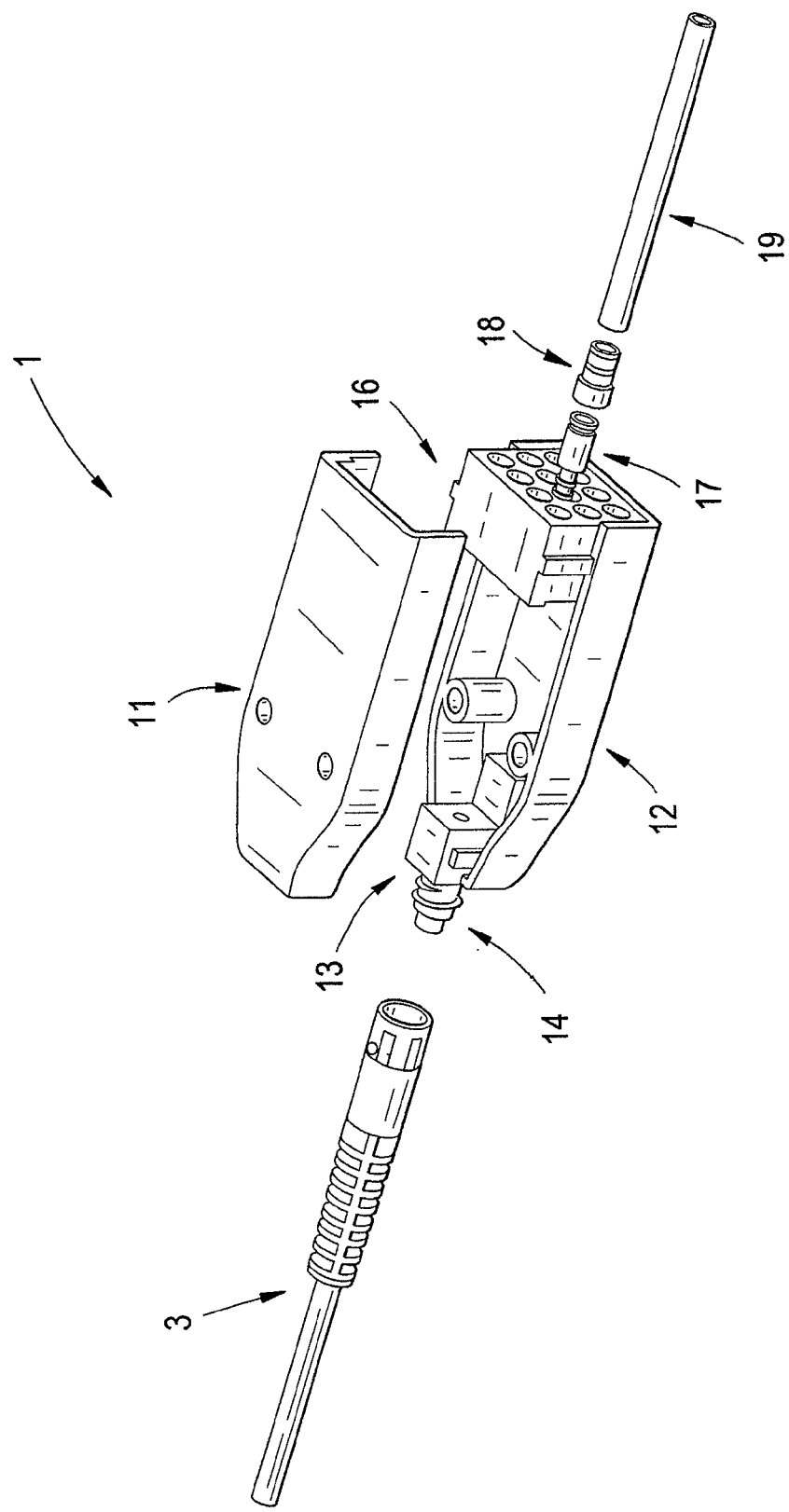

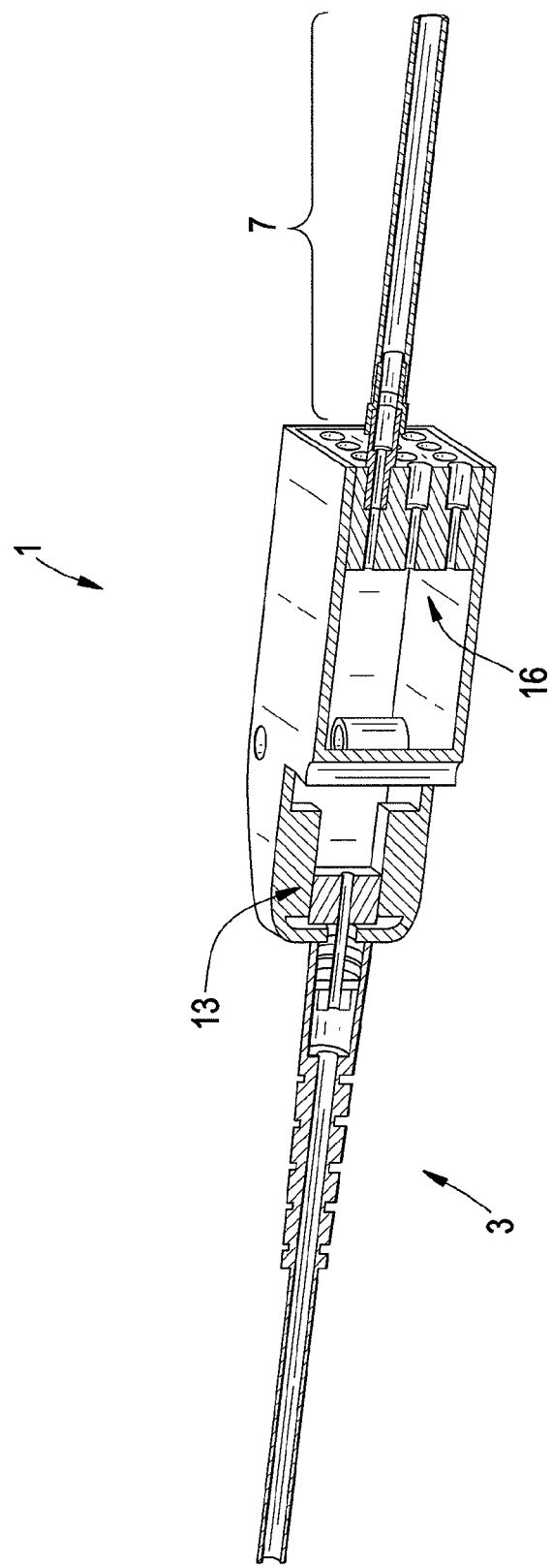

FIELD INSTALLABLE HIGH STRENGTH BREAKOUT KIT

CROSS-REFERENCE TO RELATED APPLICATIONS

This application is based upon and claims the benefit of priority from U.S. Provisional Application No. 61/725,621, filed Nov. 13, 2012, the disclosure of which is incorporated herein in its entirety by reference.

BACKGROUND

1. Field

The invention relates to a field-installable fanout assembly providing a high-strength furcation point.

2. Background

In the Private Network and Industrial markets, there is a continuing trend where copper based communication wiring is being replaced with fiber optic cabling for communication and sensing applications. Multifiber fiber optic cables efficiently carry the requisite number of fibers to the point(s) of applied use where it is then necessary to separate each individual fiber and terminate with fiber optic connectors. In many cases, the individual fibers are only 250 µm bare fibers that require careful handling to avoid damage. A fanout assembly serves as a means to facilitate the separation of multifiber cables by providing a protective housing for transitioning the fibers from the multifiber cable. In total, the fanout assemblies, consist of several common components: a multifiber cable at the input, a housing in which the furcation is accomplished and a furcation block or insert that holds buffer or furcation tubes that protect the fiber and give it a diameter suitable for a standard fiber optic connector.

Fan-out assemblies generally fall into two categories: pre-configured and field-installable. In most cases, field-installable fanout assemblies are not designed to use furcation tubes with strength elements such as kevlar/aramid fibers. Rather, to retain the furcation tubes in the furcation block, the furcation tubes are glued or epoxied to the furcation block. The weakness of this approach is that it does not yield the capability to resist significant tensile pullout forces, especially at low temperatures. Conventional offerings may capture and utilize strength elements using reinforced multifiber or exit furcation tubes to withstand pull forces that are consistent with industry standard references such as Telcordia GR-2866. However, with many conventional offerings, if they are designed to retain the strength elements, they do so using methods that are complicated or require additional tools.

SUMMARY

Exemplary implementations of the present invention address at least the above problems and/or disadvantages and other disadvantages not described above. Also, the present invention is not required to overcome the disadvantages described above, and an exemplary implementation of the present invention may not overcome any of the problems listed above.

One embodiment of the present invention involves a fanout assembly having a multifiber inlet strain relief, a fanout housing, furcation tubes, furcation assemblies for holding the plurality of furcation tubes, a multifiber retention block for receiving the multifiber inlet strain relief, and a furcation block for receiving the plurality of furcation tubes and the plurality of furcation assemblies.

Other features of the embodiment may include a fanout cover, and a fanout base. Other features of the embodiment may include the multifiber inlet strain relief being a multifiber inlet screw on strain relief.

Other features of the embodiment may include each of the furcation tubes being 2 mm in diameter.

Other features of the embodiment may include the fanout housing having a multifiber retention block having a receiving section for receiving the multifiber inlet strain relief.

Other features of the embodiment may include each of the furcation assemblies having a furcation stop ring removably attached to the furcation block, a crimp sleeve removably attached to the furcation stop ring, and a heat shrink tube attached to the crimp sleeve and one of the plurality of furcation tubes for protecting the furcation tube.

BRIEF DESCRIPTION OF THE DRAWING

FIG. 2 is an isometric view of an exemplary embodiment of a fanout kit 1 which has been disassembled.

FIG. 3A is a cross-sectional view of an exemplary embodiment of a fanout kit 1.

DETAILED DESCRIPTION

The following detailed description is provided to assist the reader in gaining a comprehensive understanding of the methods, apparatuses and/or systems described herein. Various changes, modifications, and equivalents of the systems, apparatuses and/or methods described herein will suggest themselves to those of ordinary skill in the art. Descriptions of well-known functions and structures are omitted to enhance clarity and conciseness.

The terms used in the description are intended to describe embodiments only, and shall by no means be restrictive. Unless clearly used otherwise, expressions in a singular from include a meaning of a plural form. In the present description, an expression such as "comprising" or "including" is intended to designate a characteristic, a number, a step, an operation, an element, a part or combinations thereof, and shall not be construed to preclude any presence or possibility of one or more other characteristics, numbers, steps, operations, elements, parts or combinations thereof.

The present invention applies to field installable fanout assemblies or kits which are partially configured at the OEM but final installation is completed by the end-user in the field or area of application. In the present invention, a field installable fanout assembly is proposed that will provide a high-strength furcation point to meet applications that demand high pull forces or rugged handling.

Figure 1:
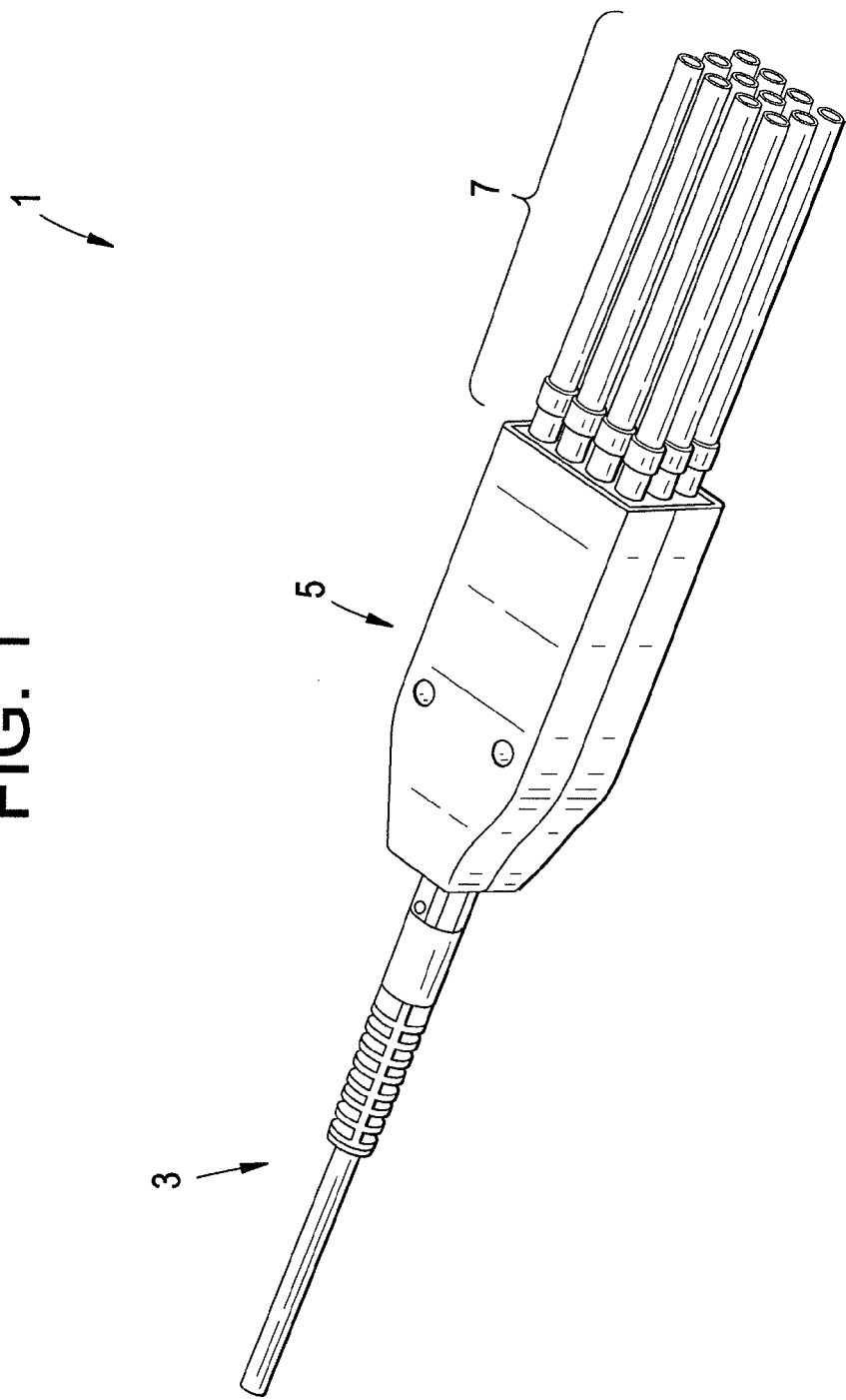
FIG. 1 is an isometric view of an exemplary embodiment of a fanout kit 1.

Referring to the drawings, FIG. 1 is an isometric view of an exemplary embodiment of a fanout kit 1. The fanout kit comprises a multifiber inlet screw on strain relief 3, a fanout housing 5, and furcation assemblies 7 for holding furcation tubes (not shown). In an exemplary embodiment, the furcation tubes are approximately 2 mm in diameter, and are inserted into a furcation block (not shown) with a furcation stop ring (not shown).

FIG. 2 is an isometric view of an exemplary embodiment of a fanout kit 1 which has been disassembled. In an exemplary embodiment, the fanout housing 5 comprises a fanout cover 11, a fanout base 12, a multifiber retention block 13, and a furcation block 16. In an exemplary embodiment, the multifiber retention block 13 may have a receiving section 14 for receiving the multifiber inlet screw on strain relief 3. In an exemplary embodiment, the receiving section 14 may be 3 mm in diameter, 4.8 mm in diameter, or have a ribbon pattern.

In an exemplary embodiment a furcation assembly 7, which holds a furcation tube (not shown) onto the furcation block 16, comprises a furcation stop ring 17, a crimp sleeve 18, and a heat shrink tube 19. In an exemplary embodiment, a furcation block 16 can hold sixteen furcation tubes and sixteen furcation assemblies 7.

FIG. 3A is a cross-sectional view of an exemplary embodiment of a fanout kit 1. In an exemplary embodiment, a furcation assembly 7 is attached to a furcation block 16, and a multifiber inlet screw on strain relief 3 is attached to a receiving section 14 of a multifiber retention block 13.

Figure 3B:
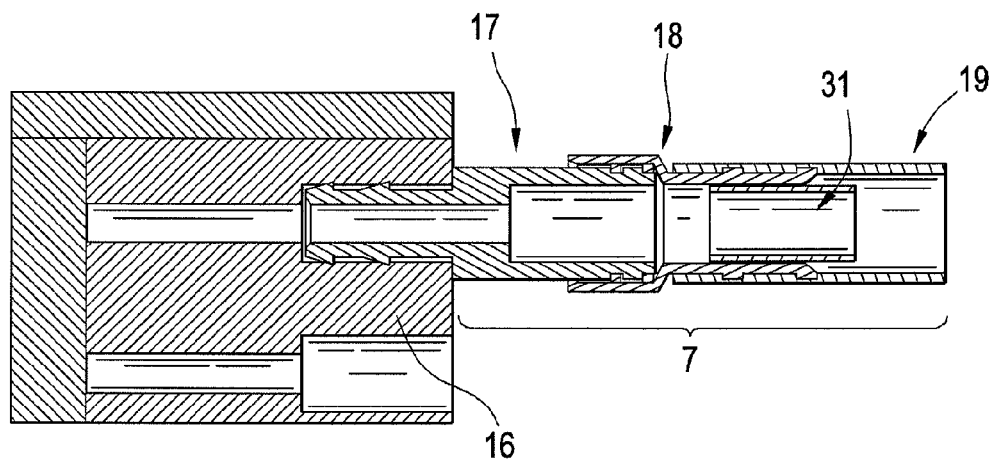
FIG. 3B is a cross-sectional view of an exemplary embodiment of an attachment of a furcation tube 31 and the furcation assembly 7 with the furcation block 16.

FIG. 3B is a cross-sectional view of an exemplary embodiment of an attachment of a furcation tube 31 and a furcation assembly 7 to a furcation block 16. In an exemplary embodiment, the furcation block 16 and the furcation stop ring 17 are removably attached. In an exemplary embodiment, the furcation stop ring 17 and the crimp sleeve 18 are removably attached. In an exemplary embodiment, the furcation tube 31 is fed through the crimp sleeve 18 into the furcation stop ring 17. In an exemplary embodiment, the furcation stop ring 17 allows wires in the furcation tube 31 to pass through the furcation block 16. In an exemplary embodiment, once the furcation stop ring 17, the crimp sleeve 18, and the furcation tube 31 are removably attached, the heat shrink tube 19 is heated and shrunk around the crimp sleeve 18 and the furcation tube 31 to protect the furcation tube 31.

The invention claimed is:

1. A fanout assembly comprising:
   a multifiber inlet strain relief;
   a fanout housing;
   a plurality of furcation tubes;
   a plurality of furcation assemblies for holding the plurality of furcation tubes;
   a multifiber retention block for receiving the multifiber inlet strain relief, and
   a furcation block for receiving the plurality of furcation tubes and the plurality of furcation assemblies, wherein each of the plurality of furcation assemblies comprises:
   a furcation stop ring removably attached to the furcation block; and
   a crimp sleeve removably attached to a portion of the furcation stop ring outside of the furcation block.

2. The fanout kit of claim 1, wherein the fanout housing comprises: a fanout cover, and
   a fanout base.

3. The fanout kit of claim 1, wherein the multifiber inlet strain relief is a multifiber inlet screw on strain relief.

4. The fanout assembly of claim 1, wherein each of the plurality of furcation tubes is 2 mm in diameter.

5. The fanout kit of claim 2, wherein the fanout housing comprises:
   a multifiber retention block comprising a receiving section for receiving the multifiber inlet strain relief.

6. The fanout kit of claim 2, wherein each of the plurality of furcation assemblies further comprises:
   a heat shrink tube attached to the crimp sleeve and one of the plurality of furcation tubes for protecting the furcation tube.

7. The fanout assembly of claim 6, wherein an inner surface of the crimp sleeve directly at least one of the furcation tubes, and
   an outer surface of the crimp sleeve directly contacts the heat shrink tube.

8. The fanout assembly of claim 1, wherein the crimp sleeve is directly attached to the portion of the furcation stop ring outside of the furcation block.

9. The fanout assembly of claim 1, wherein the portion of the furcation stop ring is also outside of the fanout housing.

10. The fanout assembly of claim 9, wherein the crimp sleeve is directly attached to the portion of the furcation stop ring outside of the furcation block and outside of the fanout housing.

11. The fanout assembly of claim 1, wherein the furcation stop ring is removably attached to the furcation block such that the furcation stop ring may be removed by a force exerted upon the furcation stop ring in a direction away from the furcation block.

* * * * *